US012798493B2

(12) United States Patent
Fan et al.

(10) Patent No.: US 12,798,493 B2
(45) Date of Patent: *Nov. 17, 2026

(54) IN-VEHICLE DISPLAY

(71) Applicant: Tianjin Yunfan Electronic Technology Co., Ltd, Tianjin (CN)

(72) Inventors: Qingzhuang Fan, Tianjin (CN); Shengshi Wang, Tianjin (CN)

(73) Assignee: Tianjin Yunfan Electronic Technology Co., Ltd, Tianjin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/457,149

(22) Filed: Jan. 23, 2026

(65) Prior Publication Data

US 2026/0152130 A1 Jun. 4, 2026

Related U.S. Application Data

(63) Continuation of application No. 18/918,058, filed on Oct. 17, 2024, now Pat. No. 12,559,042.

(51) Int. Cl.
*B60R 11/02* (2006.01)
*B60R 11/00* (2006.01)

(52) U.S. Cl.
CPC ... *B60R 11/0235* (2013.01); *B60R 2011/0007* (2013.01); *B60R 2011/0063* (2013.01); *B60R 2011/007* (2013.01)

(58) Field of Classification Search
CPC ..... B60R 2011/0001; B60R 2011/0003; B60R 2011/0005; B60R 2011/0007; B60R 2011/0057; B60R 2011/007; B60R 11/0229; B60R 11/0235; B60R 11/0241; F16M 11/14; F16M 11/041; H02J 7/0044; H04M 1/04
USPC .................................................. 348/148, 837
See application file for complete search history.

(56) References Cited

U.S. PATENT DOCUMENTS

2009/0185341 A1* 7/2009 Jang ...................... G06F 1/1601 361/679.22
2022/0089100 A1* 3/2022 Ely ..................... B60R 11/0241
2023/0051385 A1* 2/2023 Ma ....................... B60R 11/0241
2024/0063838 A1* 2/2024 Hynecek ................. H04M 1/04

OTHER PUBLICATIONS

"ULDIGI Car Phone Holder Magnetic Dashboard Phone Bracket Universal Fit 360° Rotation Strong Adhesive Hands Driving Support Grey Stripe" https:/www.amazon.co.uk/ULDIGI-Holder-Charger-Magnetic-Support/dp/BOD988X4Z67th1 Date first available Jul. 11, 2024, 6 Pages. (Year: 2024).*

* cited by examiner

*Primary Examiner* — Nathnael Aynalem

(57) ABSTRACT

An in-vehicle display is provided in the present disclosure, including a display device and a support bracket. A back of the display device defines a first magnetic attracting area. The support bracket is configured to be mounted on a center console of a vehicle. The support bracket defines a second magnetic attracting area. The second magnetic attracting area is magnetically connectable to the first magnetic attracting area. For the aforementioned in-vehicle display, by enabling the support bracket to be firstly mounted to a suitable position of the center console, and subsequently enabling the back of the display device to approach the support bracket, the display device may be automatically magnetically attracted to the support bracket. In this way, the display device can be installed and removed quickly and conveniently.

19 Claims, 12 Drawing Sheets

IN-VEHICLE DISPLAY

CROSS-REFERENCE TO RELATED APPLICATIONS

The present application is a continuation application of U.S. patent application Ser. No. 18/918,058, filed on Oct. 17, 2024, the contents of which are incorporated herein by reference in their entirety.

TECHNICAL FIELD

The present disclosure relates to a field of vehicle accessories, particularly to an in-vehicle display.

BACKGROUND

An in-vehicle display is generally mounted on an upper portion of a center console of a vehicle, providing an additional electronic display area. In the prior art, the in-vehicle display includes a display device and a support bracket, and the display device is usually bolted to the support bracket, or the display device is connected to the support bracket via a snap-fit connection, and the support bracket is subsequently adhered to the center console of the vehicle. However, such existing in-vehicle display is troublesome to install, and is inconvenient for removal or adjustment.

SUMMARY

The present disclosure provides an in-vehicle display configured to be mounted on a center console of a vehicle. The in-vehicle display includes a display device and a support bracket. A back of the display device defines a first magnetic attracting area. The support bracket supports the display device and defines a second magnetic attracting area. The second magnetic attracting area is magnetically connectable to the first magnetic attracting area.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

Figure 1:
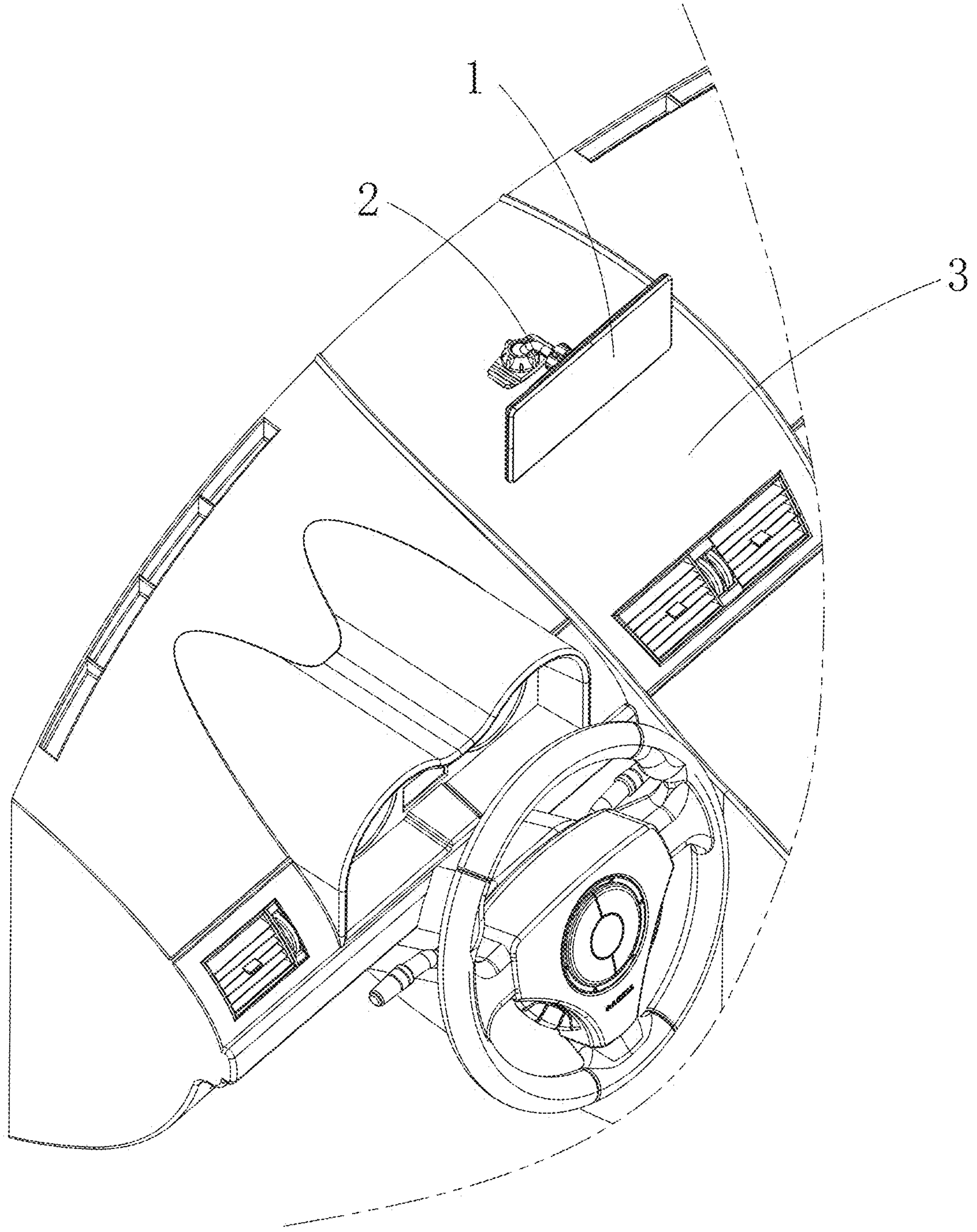
FIG. 1 is a schematic view of an in-vehicle display in use mounted on a center console according to an embodiment.

Reference numerals in the drawings:

display device 1, back of the display device 101, connecting recess 102, first magnetic attracting area 1001;
back shell 11, face of the back shell facing a magnetic connecting element 1101; first region 111, second region 112, third region 113, protruding flange 1121; receiving space 1002;
screen shell 12;
first magnetic attracting element 13;
support bracket 2, second magnetic attracting area 2001;
magnetic connecting element 21, face of the magnetic connecting element attaching to the display device 21001, connecting protrusion 2101;
first shell 211, face of the first shell facing the display device 2111;
second shell 212;
second magnetic attracting element 213;
connecting plate 214, side of the connecting plate away from the second magnetic attracting area 2141;
first connecting portion 215, first connecting block 2151, first ball-jointed groove 2152;
mounting base 22;
mounting plate 221, side of the mounting plate away from a center console 2211, cut slot 2212, adhesive layer 2213;
second connecting portion 222, second connecting block 2221, second ball-jointed groove 2222;
support rod 23, first end of the support rod 231, second end of the support rod 232;
first locking element 24;
second locking element 25;
center console 3.

DETAILED DESCRIPTION

Unless otherwise defined, all technical and scientific terms used herein have the same meaning as commonly understood by those skilled in the art to which this disclosure belongs. The terms used in the description of the application herein are intended for describing particular embodiments only and are not intended to limit the present disclosure. In the description, claims, and the above drawings of the present disclosure, the terms “including” and “having”, as well as their variants, are intended to convey a non-exclusive inclusion. The terms “first”, “second”, etc., as used herein, are intended to distinguish between different objects, rather than to describe a particular order.

Reference to “embodiments” herein implies that a particular feature, structure, or characteristic described in connection with an embodiment may be included in at least one embodiment of the present disclosure. The appearance of the phrase at various places in the specification does not necessarily refer to the same embodiment, nor is it a separate or alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1-11, an in-vehicle display is provided in the present disclosure. The in-vehicle display includes a display device 1 and a support bracket 2. The support bracket 2 is configured to be mounted on a center console 3 of a vehicle. The display device 1 is connected with the support bracket 2 via a magnetic attraction.

Figure 3:
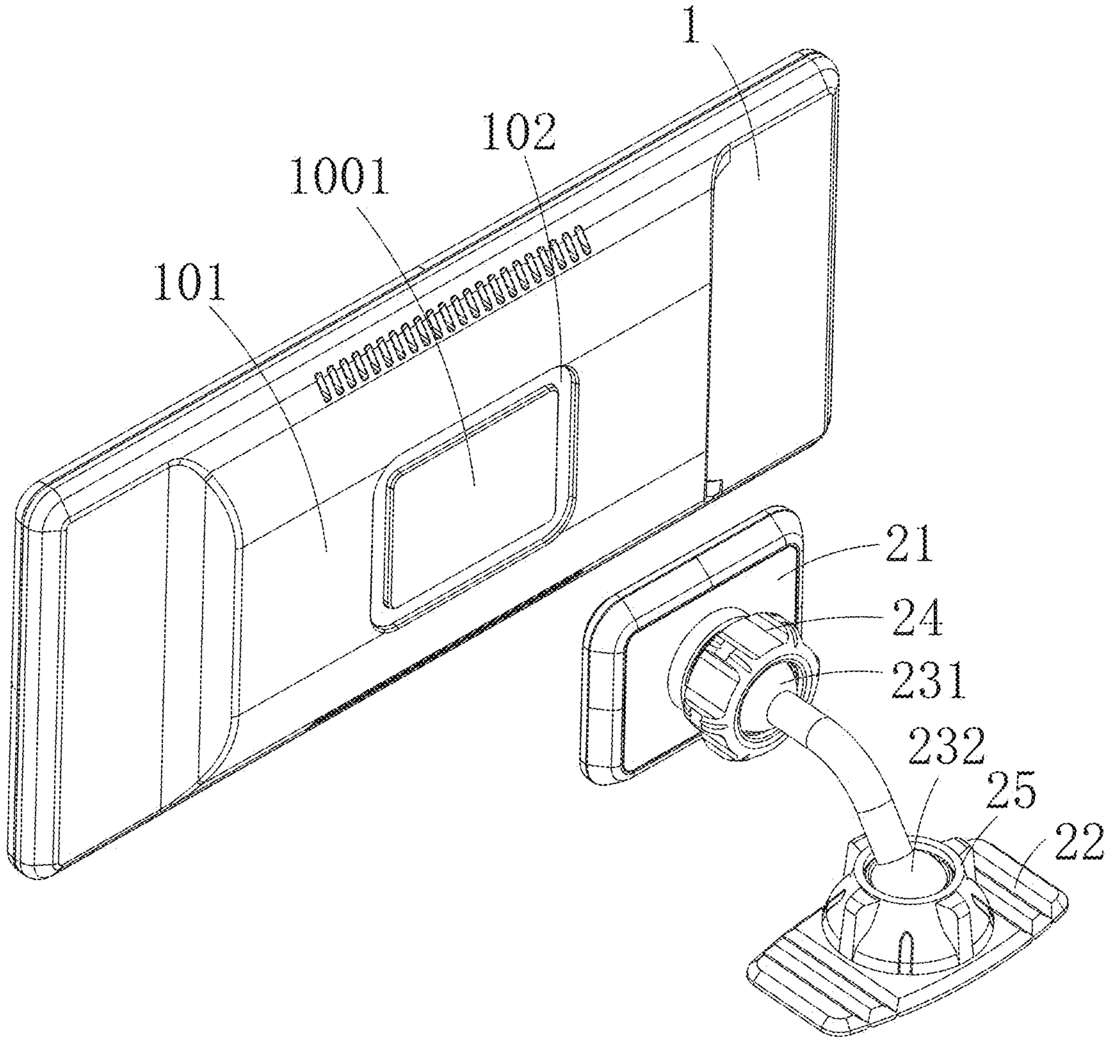
FIG. 3 is a schematic view I of a connection relationship between a display device and a support bracket according to an embodiment.
Figure 4:
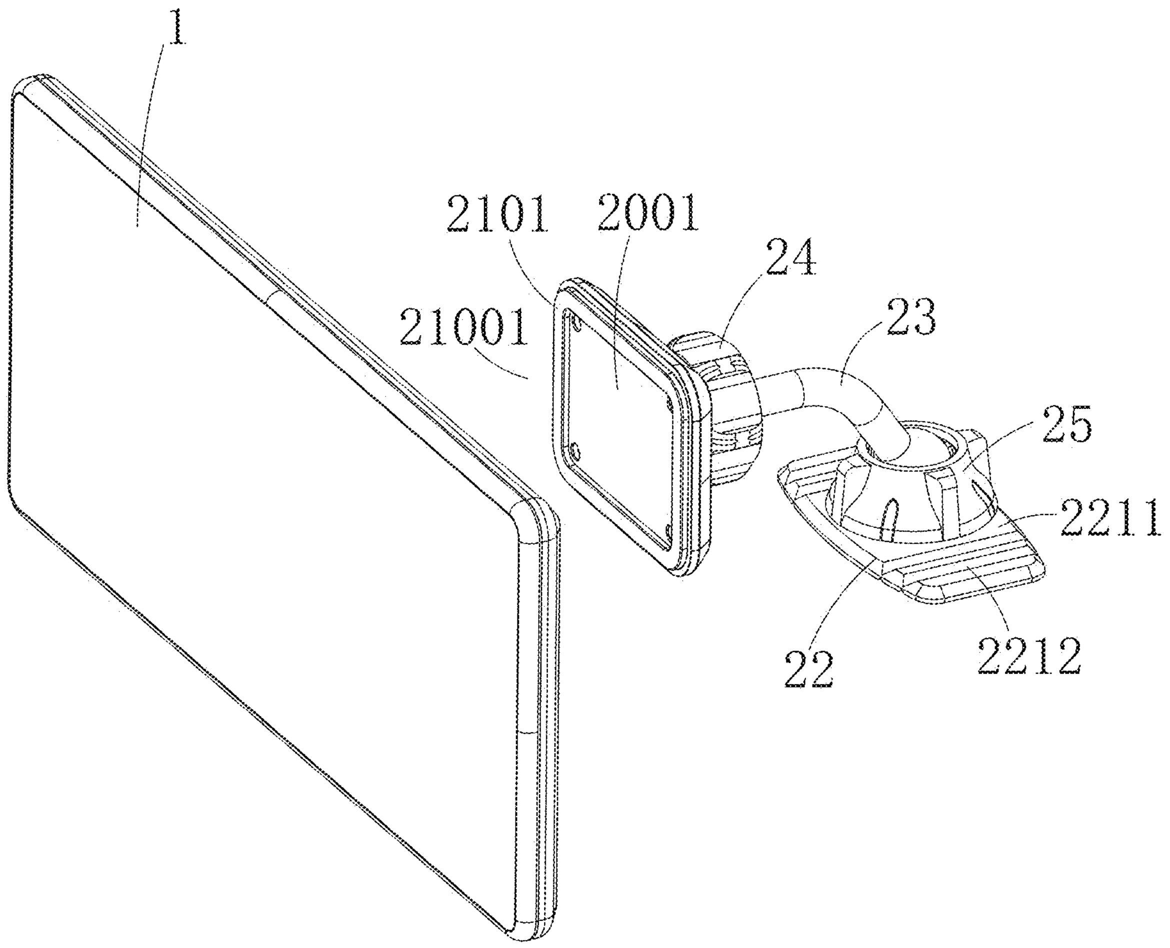
FIG. 4 is a schematic view II of the connection relationship between a display device and a support bracket according to an embodiment.

Specifically, as shown in FIG. 3, a back 101 of the display device 1 defines a first magnetic attracting area 1001. As shown in FIG. 4, the support bracket 2 defines a second magnetic attracting area 2001. The second magnetic attracting area 2001 is magnetically connectable to the first magnetic attracting area 1001. During installation, the support bracket 2 is firstly mounted to a suitable position of the center console 3 by adhesion or clamping, subsequently the back 101 of the display device 1 is enabled to approach the support bracket 2, and then the display device 1 may be automatically attracted to the support bracket 2 under a magnetic attraction. In this way, the display device 1 can be installed and removed quickly and conveniently.

Figure 2:
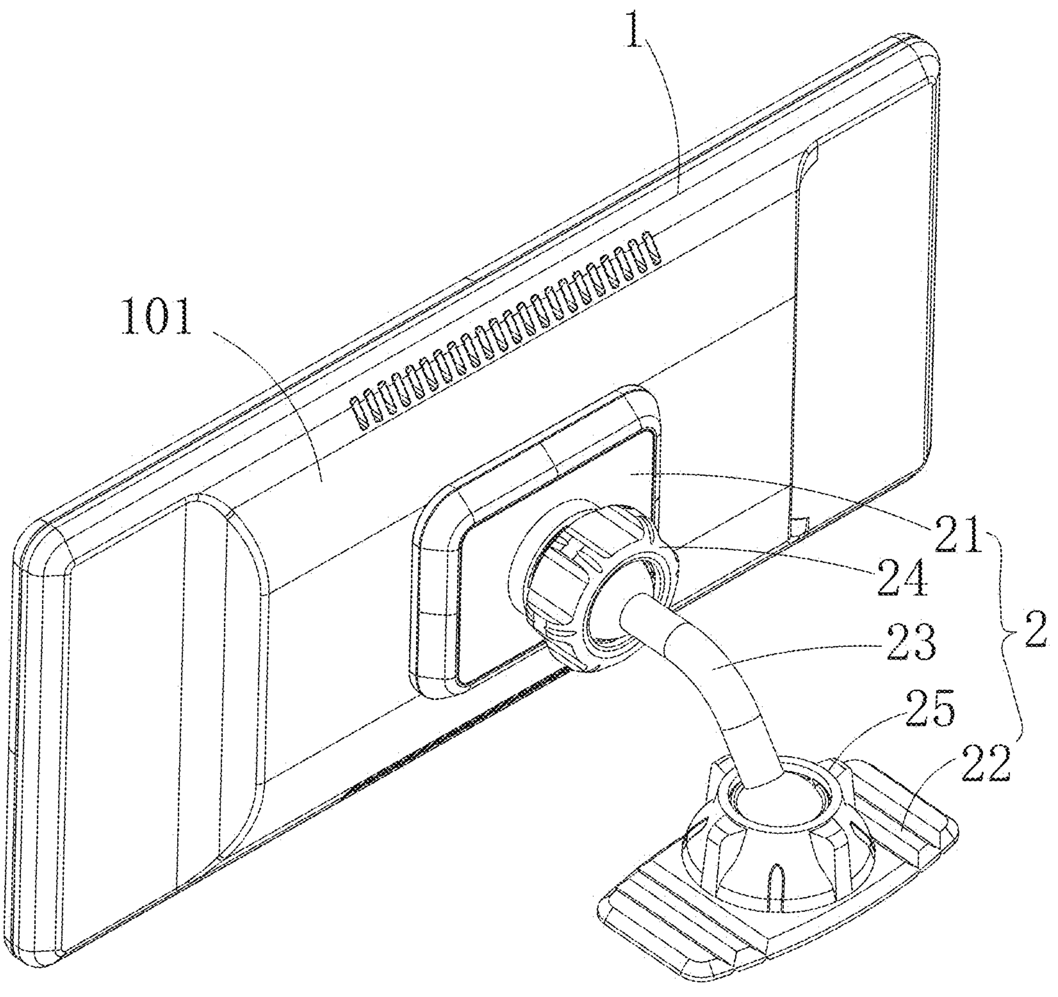
FIG. 2 is a schematic view of an overall structure of the in-vehicle display according to an embodiment.

Referring to FIGS. 2-4, in the present embodiment, the support bracket 2 includes a magnetic connecting element 21, a mounting base 22, and a support rod 23. The second magnetic attracting area 2001 is defined on the magnetic connecting element 21. When the first magnetic attracting area 1001 is magnetically attached to the second magnetic attracting area 2001, the magnetic connecting element 21 is attached to the back 101 of the display device 1. The mounting base 22 is configured to be mounted on the center console 3 of the vehicle. A first end 231 of the support rod 23 is connected to the magnetic connecting element 21, and a second end 232 of the support rod 23 is connected to the mounting base 22.

Furthermore, to enhance stability of the connection between the display device 1 and the magnetic connecting element 21, and to prevent the display device 1 from slipping, in the present embodiment, the back 101 of the display device 1 defines a connecting recess 102, and a face 21001 of the magnetic connecting element 21 attached to the display device 1 is arranged with a connecting protrusion 2101. When the first magnetic attracting area 1001 is magnetically attached to the second magnetic attracting area 2001, the connecting protrusion 2101 is inserted into the connecting recess 102. In this way, tangential load-bearing capacity of the magnetic connecting element 21 to the display device 1 can be improved, preventing the display device 1 from sliding along a surface of the magnetic connecting element 21.

Specifically, the connecting recess 102 is defined in an annular shape surrounding the first magnetic attracting area 1001, and the connecting protrusion 2101 is arranged in an annular shape surrounding the second magnetic attracting area 2001. The annular structures can provide greater stability.

Figure 5:
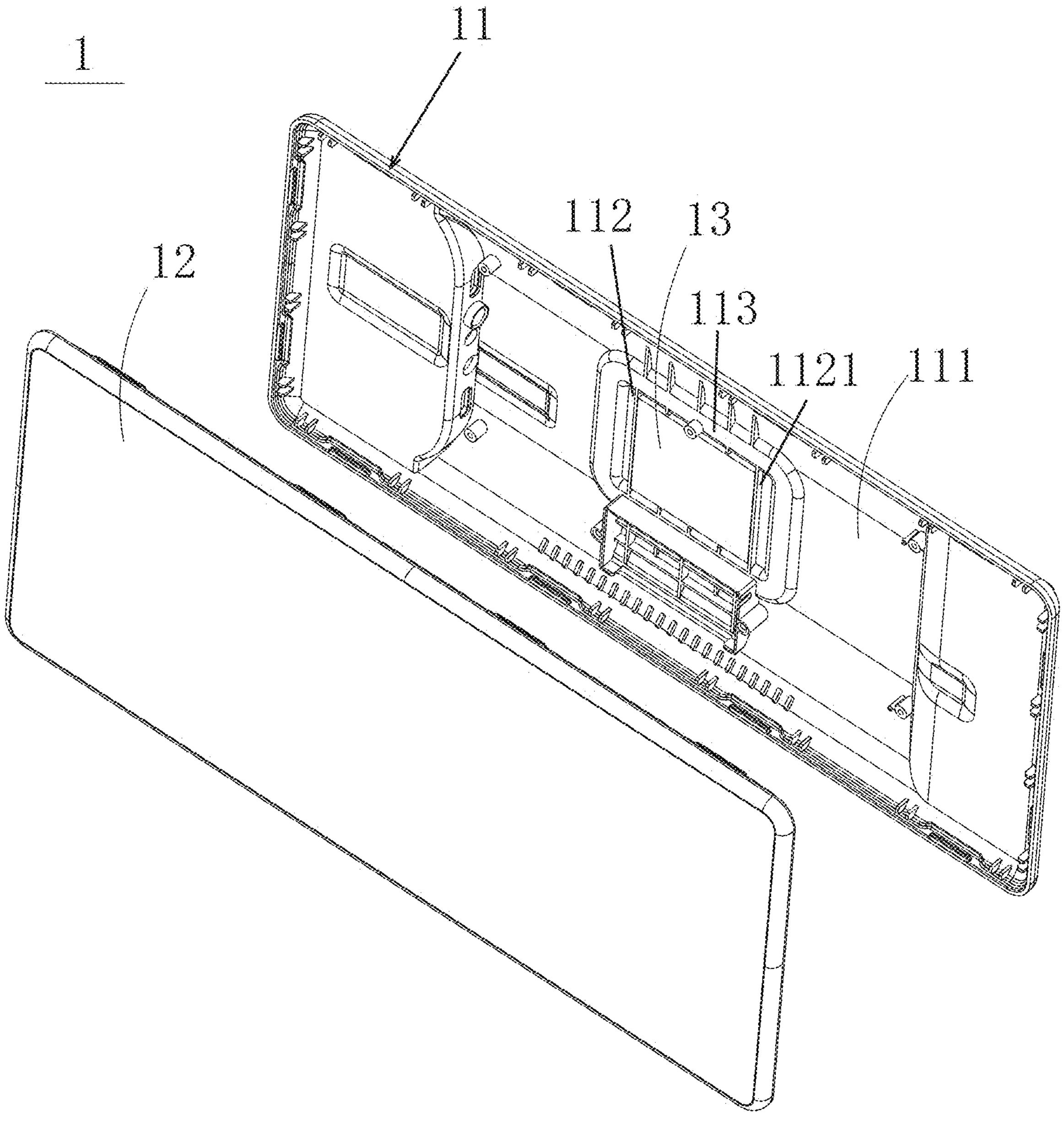
FIG. 5 is a schematic view of a location of a first magnetic attracting element in the display device according to an embodiment.
Figure 6:
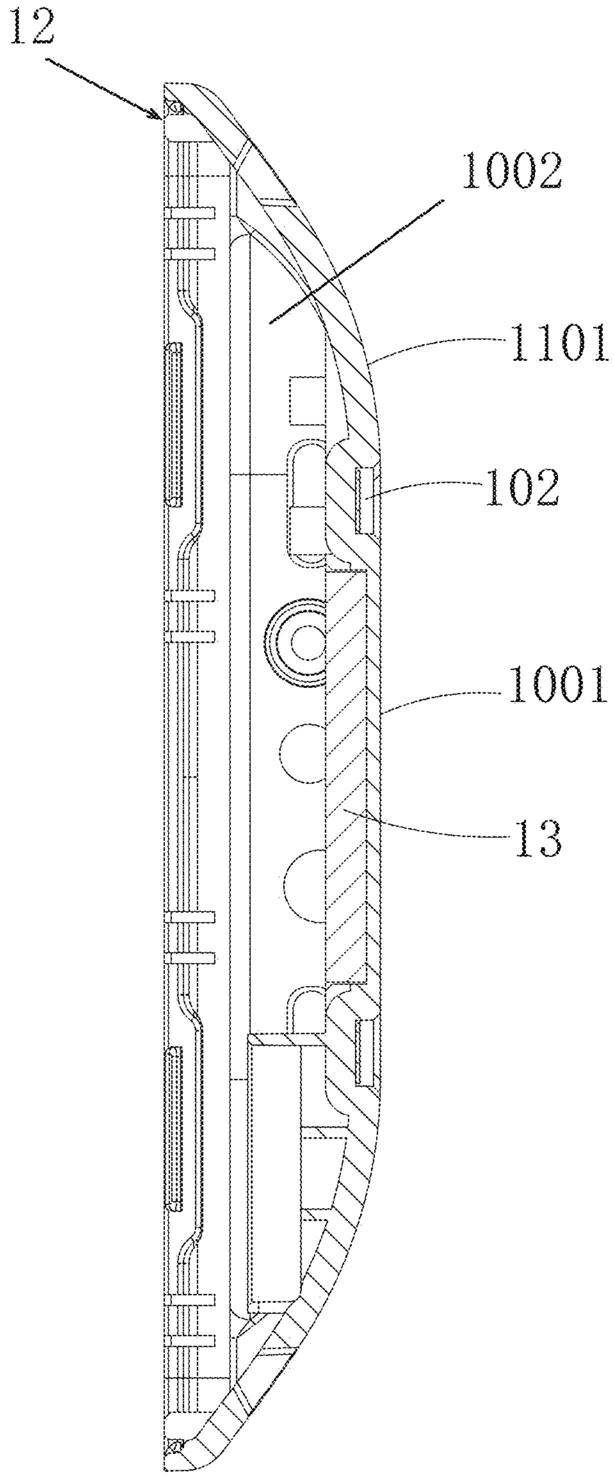
FIG. 6 is a sectional view of a back shell according to an embodiment.

Regarding a magnetic connecting structure between the display device 1 and the magnetic connecting element 21, in the present embodiment, specifically, the display device 1 includes a back shell 11, a screen shell 12, and a first magnetic attracting element 13. The back shell 11 is made of plastic and the screen shell 12 is used for mounting a display screen. The connecting recess 102 is defined in a face 1101 of the back shell 11 facing the magnetic connecting element 21. The back shell 11 and the screen shell 12 are snap-fitted to each other to form an integral structure. The first magnetic attracting element 13 is located between the back shell 11 and the screen shell 12. The first magnetic attracting element 13 is attached to the back shell 11 by means of embedding or adhering. The face 1101 of the back shell 11 facing the magnetic connecting element 21 defines the first magnetic attracting area 1001, as shown in FIGS. 5-6. The back shell 11 and the screen shell 12 are connected to each other to define a receiving space 1002 therebetween. The back shell 11 has an inner face facing towards the receiving space 1002. The inner face of the back shell 11 includes a first region 111, a second region 112, and a third region 113. The second region 112 is located at a back side of the first magnetic attracting area 1001 and configured to receive the first magnetic attracting element 13. The third region 113 protrudes towards the receiving space 1002 with respect to the first region 111 and surrounds the first magnetic attracting element 13. The third region 113 is located at a back side of the connecting recess 102 and serves as a bottom of the connecting recess 102. The inner face of the back shell 11 further includes a protruding flange 1121 protruding from the second region 112 towards the receiving space 1002. The first magnetic attracting element 13 is encased and surrounded by the protruding flange 1121, thereby preventing the first magnetic attracting element 13 from moving along a direction parallel to the inner face of the back shell 11.

Figure 7:
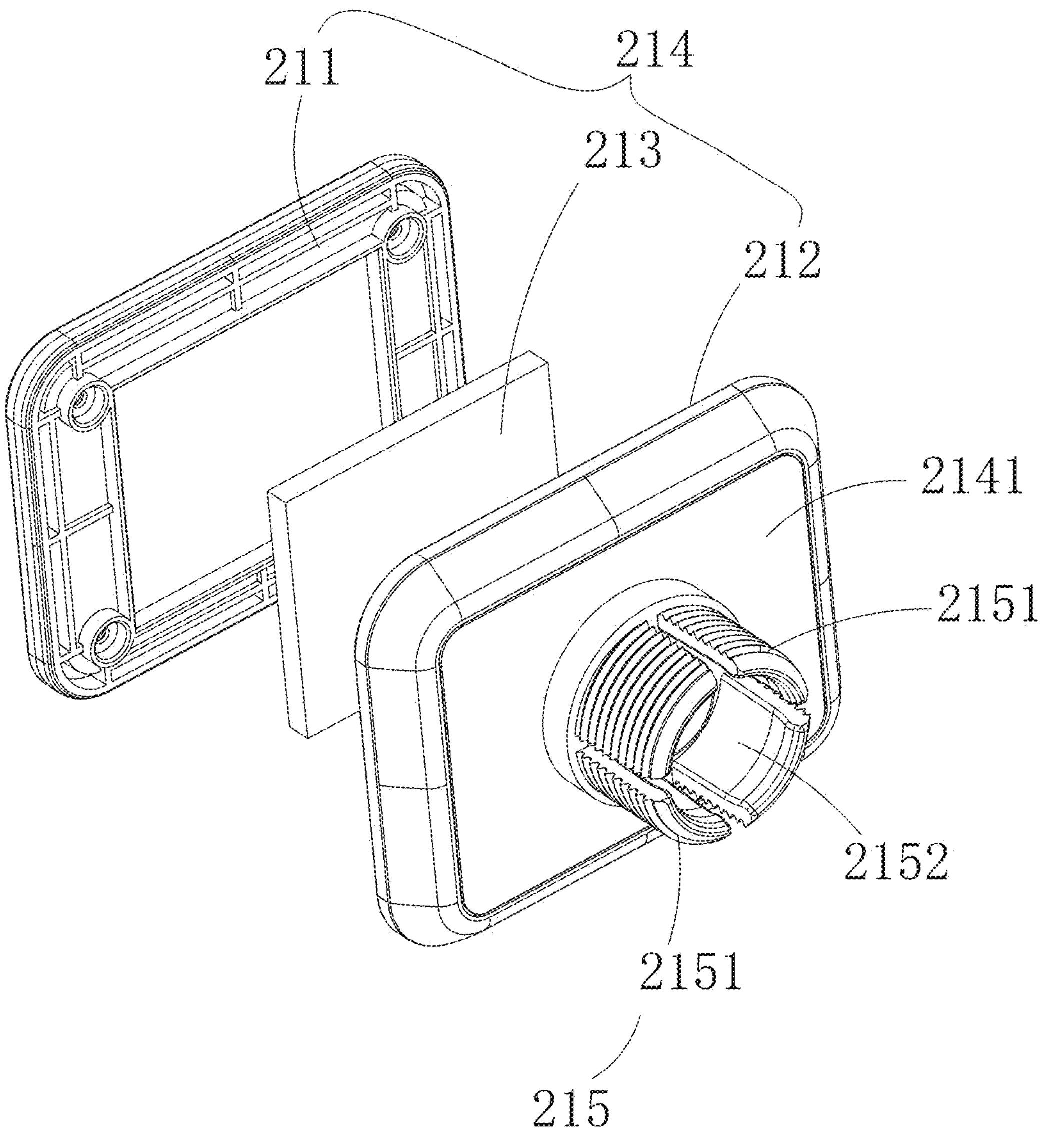
FIG. 7 is a structural view of a magnetic connecting element according to an embodiment.

Correspondingly, the magnetic connecting element 21 includes a first shell 211, a second shell 212, and a second magnetic attracting element 213. The first shell 211 is fixedly connected to the second shell 212 by bolts. Each of the first shell 211 and the second shell 212 is made of plastic. The connecting protrusion 2101 is arranged on a face 2111 of the first shell 211 facing the display device 1. The support rod 23 is connected to the second shell 212. The second magnetic attracting element 213 is located between the first shell 211 and the second shell 212. The second magnetic attracting element 213 is attached to the first shell 211 by means of embedding or adhering. The face 2111 of the first shell 211 facing the display device 1 defines the second magnetic attracting area 2001, as shown in FIGS. 4 and 7.

Specifically, at least one of the first magnetic attracting element 13 and the second magnetic attracting element 213 is a magnet, and the other one is a metallic object containing iron, cobalt, or nickel. Alternatively, both the first magnetic attracting element 13 and the second magnetic attracting element 213 are magnets.

Figure 8:
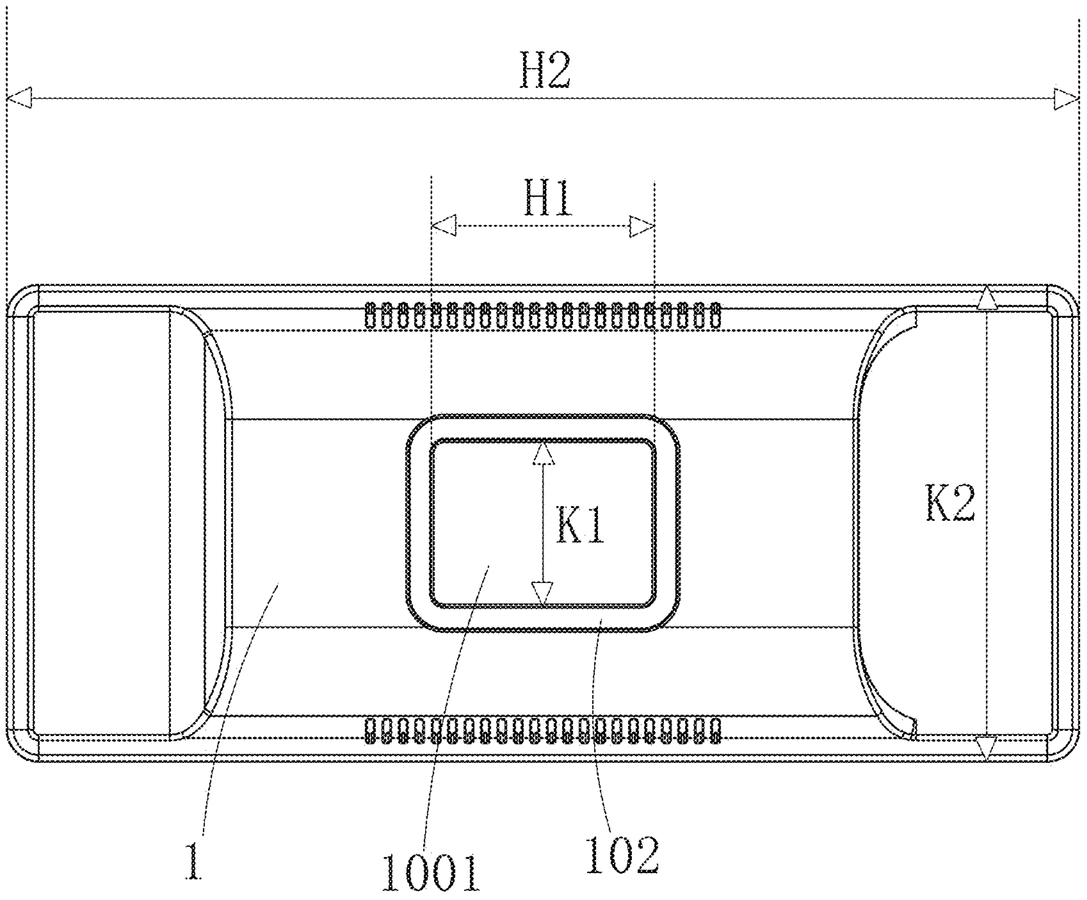
FIG. 8 is a schematic view of a proportion of a length of the first magnetic attracting area and a proportion of a width of the first magnetic attracting area according to an embodiment.

Furthermore, as shown in FIG. 8, to ensure sufficient attraction capability of the support bracket 2 to the display device 1, in the present embodiment, the first magnetic attracting area 1001 is in a same shape with the second magnetic attracting area 2001, and an area of the first magnetic attracting area 1001 is equal to an area of the second magnetic attracting area 2001. Moreover, a length H1 of the first magnetic attracting area 1001 is in a range of from one-fifth to one-third of a length H2 of the display device 1, for instance, one-quarter of the length H2 of the display device 1. A width K1 of the first magnetic attracting area 1001 is in a range of from one-quarter to three-fifths of a width K2 of the display device 1, for example, one-third of the width K2 of the display device 1. In this way, connection strength between the magnetic connecting element 21 and the display device 1 can be ensured.

Furthermore, to facilitate adjustment of an angle of the display device 1, in the present embodiment, the first end 231 of the support rod 23 is movably connected to the magnetic connecting element 21, and the second end 232 of the support rod 23 is movably connected to the mounting base 22.

Figure 9:
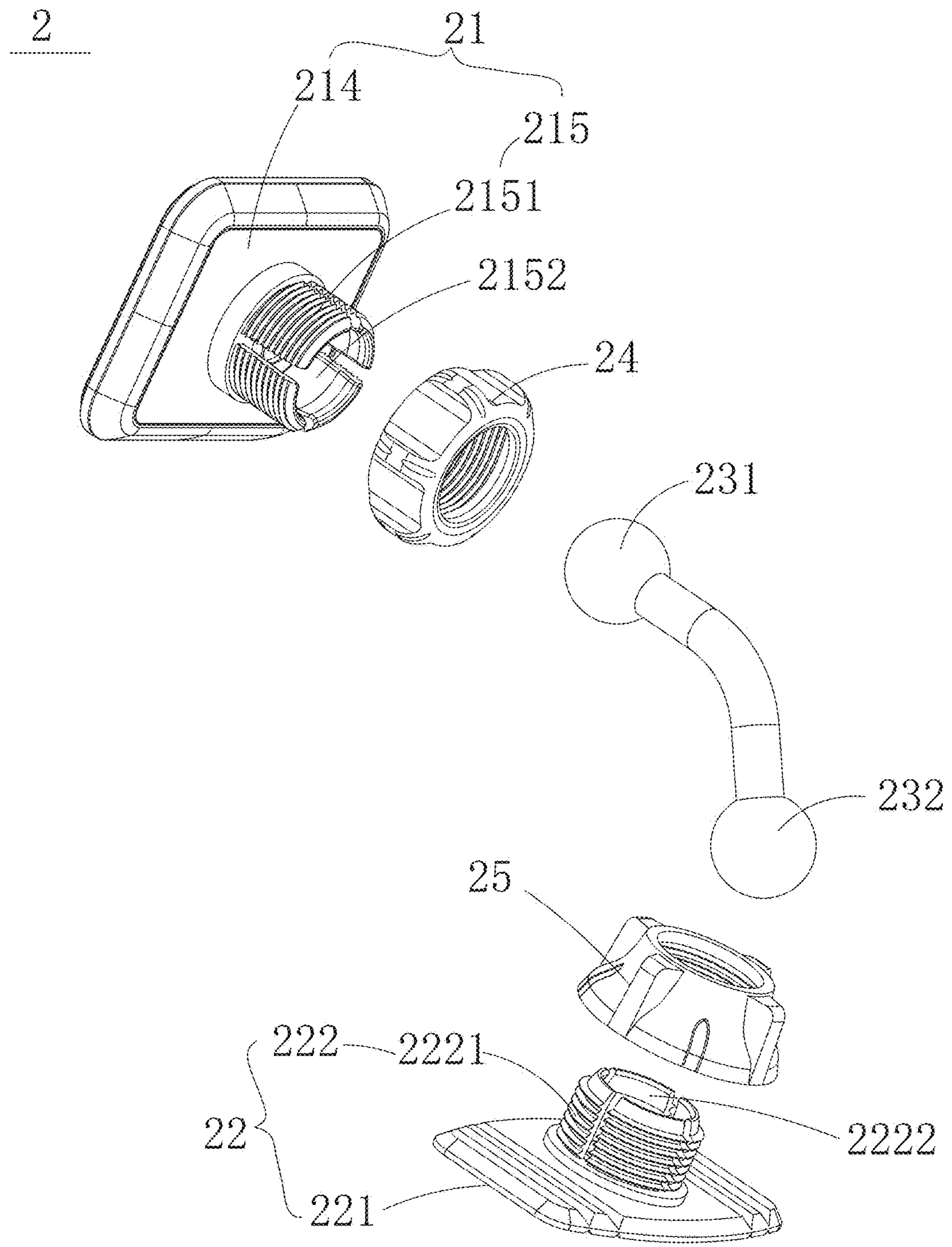
FIG. 9 is an exploded view of a support rod according to an embodiment.
Figure 10:
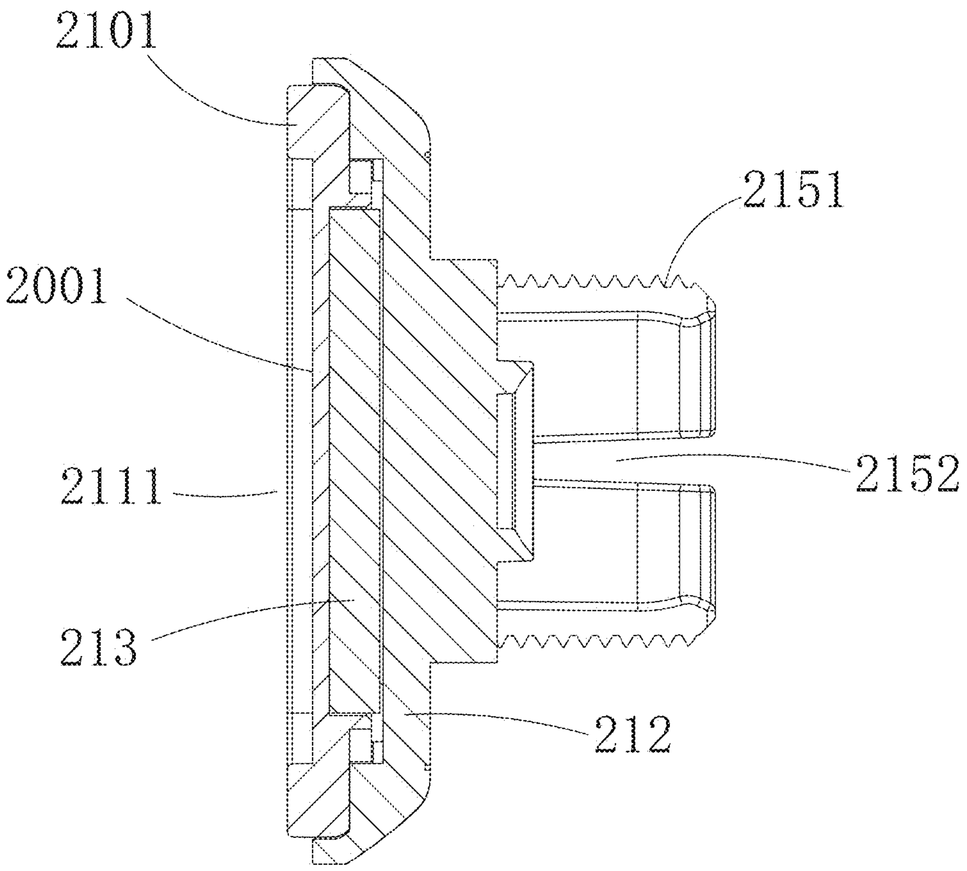
FIG. 10 is a sectional view of the magnetic connecting element according to an embodiment.

Specifically, as shown in FIGS. 9-10, the magnetic connecting element 21 includes a connecting plate 214 and a first connecting portion 215. The connecting plate 214 includes the aforementioned first shell 211, second shell 212, and second magnetic attracting element 213. The second magnetic attracting area 2001 is defined on the connecting plate 214. The first connecting portion 215 is arranged on a side 2141 of the connecting plate 214 away from the second magnetic attracting area 2001. The first end 231 of the support rod 23 is arranged in a spherical structure and is connected to the first connecting portion 215 in a ball-hinged manner.

In detail, the first connecting portion 215 includes a plurality of first connecting blocks 2151 connected to the connecting plate 214. The plurality of first connecting blocks 2151 are arranged in a circumferential distribution and enclosed to form a first ball-jointed groove 2152. The first end 231 of the support rod 23 is arranged in the first ball-jointed groove 2152 and ball-hinged to the first connecting portion 215. An outer wall of each of the plurality of first connecting blocks 2151 is arranged with an external thread. Correspondingly, the support bracket 2 further includes a first locking element 24 in a shape of a ring. The first locking element 24 is arranged with an internal thread. An inner wall of the first locking element 24 has a taper. The first locking element 24 may sleeve an outer side of the first connecting portion 215 and may be screwed with the first connecting portion 215. When the first locking element 24 rotates and approaches the connecting plate 214, i.e., when the first locking element 24 is tightened with the first connecting portion 215, the first locking element 24 may exert pressure on the plurality of first connecting blocks 2151 and drive the plurality of first connecting blocks 2151 to close inwardly, thereby clamping the first end 231 of the support rod 23. In this way, detachment of the first end 231 of the support rod 23 from the first ball-jointed groove 2152 can be prevented, and the angular relationship between the support rod 23 and the connecting plate 214 can be locked. Conversely, when the first locking element 24 is driven away from the connecting plate 214, the pressure exerted by the first locking element 24 on each first connecting block 2151 is released, allowing an angle between the connecting plate 214 and the support rod 23 to be adjusted.

Figure 11:
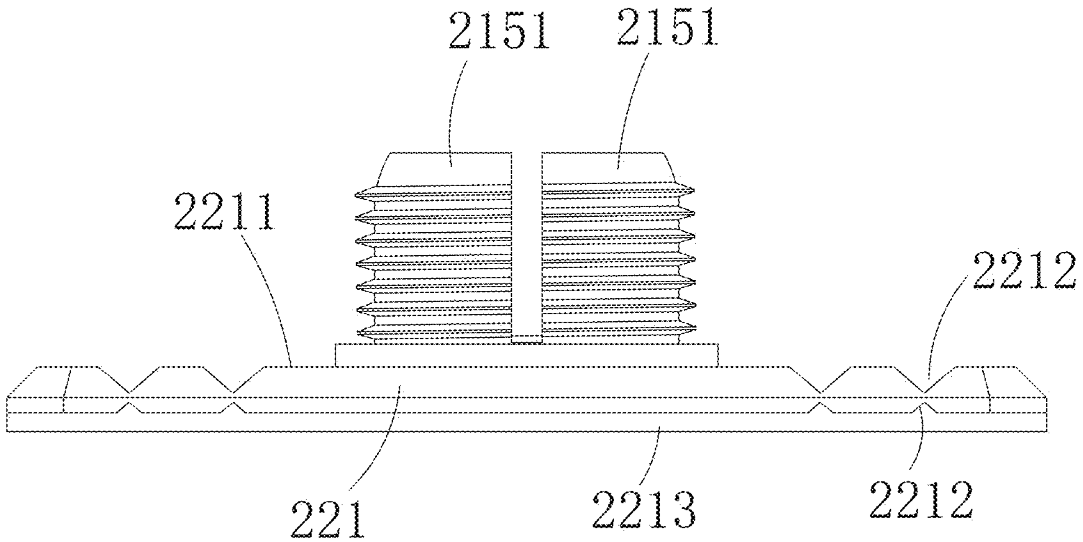
FIG. 11 is a structural view of a mounting base according to an embodiment.

Similarly, as shown in FIGS. 9 and 11, the mounting base 22 includes a mounting plate 221 and a second connecting portion 222. The mounting plate 221 is configured to be attached to the center console 3 of the vehicle. The second connecting portion 222 is arranged on a side 2211 of the mounting plate 221 away from the center console 3. The second end 232 of the support rod 23 is also arranged in a spherical structure and is connected to the second connecting portion 222 in a ball-hinged manner.

In detail, the second connecting portion 222 includes a plurality second connecting blocks 2221 connected to the mounting plate 221. The plurality of second connecting blocks 2221 are arranged in a circumferential distribution and enclosed to form a second ball-jointed groove 2222. The second end 232 of the support rod 23 is arranged in the second ball-jointed groove 2222 and ball-hinged to the second connecting portion 222. An outer wall of each of the plurality of second connecting blocks 2221 is arranged with an external thread. Correspondingly, the support bracket 2 further includes a second locking element 25 in a shape of a ring. The second locking element 25 is arranged with an internal thread. An inner wall of the second locking element 25 has a taper. The second locking element 25 may sleeve an outer side of the second connecting portion 222 and may be screwed with the second connecting portion 222. When the second locking element 25 rotates and approaches the mounting plate 221, i.e., when the second locking element 25 is tightened with the second connecting portion 222, the second locking element 25 may exert pressure on the plurality of second connecting blocks 2221 and drive the plurality of second connecting blocks 222 to close inwardly, thereby clamping the second end 232 of the support rod 23. In this way, detachment of the second end 232 of the support rod 23 from the second ball-jointed groove 2222 can be prevented, and the angular relationship between the support rod 23 and the mounting plate 221 can be locked. Conversely, when the second locking element 25 is driven away from the mounting plate 221, the pressure exerted by the second locking element 25 on each second connecting block 2221 is released, allowing an angle between the mounting plate 221 and the support rod 23 to be adjusted.

Specifically, the ball-hinged structure offers a higher degree of freedom than an ordinary hinge structure. In the present embodiment, both the first end 231 and the second end 232 of the support rod 23 adopt the ball-hinged structure, allowing the display device 1 to have a larger range of adjustment in position and angle.

Furthermore, a surface of the center console 3 may not be flat and may be a face with a curvature. In order to enable the mounting plate 221 to be better attached to the surface of the center console 3, in an embodiment, the mounting plate 221 is made of a flexible material. In this way, the mounting plate 221 is allowed to deform according to a shape of the surface of the center console 3, thereby increasing a contact area between the mounting plate 221 and the center console 3, and enhancing connection strength between the mounting plate 221 and the center console 3.

In order to enable the mounting plate 221 to be better attached to the surface of the center console 3, in another embodiment, the mounting plate 221 is made of high-resilience plastic. As shown in FIGS. 4 and 11, the mounting plate 221 defines a plurality of cut slots 2212 extending along a plate face of the mounting plate 221. The mounting plate 221 can bended by users taking the cut slot 2212 as an axis, enabling the mounting plate 221 to better match a shape of the surface of the center console 3. To enable the mounting plate 221 easier to be bended and deform, the cut slots 2212 are arranged in a "V" shape, and cut slots 2212 are defined in both a face of the mounting plate 221 in contact with the center console 3 and a face of the mounting plate 221 away from the center console 3, with the cut slots 2212 in both faces positioned correspondingly, further reducing difficulty degree in the deformation of the mounting plate 221.

A bottom of the mounting plate 221 is arranged with an adhesive layer 2213. The mounting plate 221 is adhered to the surface of the center console 3 through the adhesive layer 2213.

Since the in-vehicle display is generally placed on a top of the center console 3 for use, the mounting plate 221 needs to be adhered to a top face of the center console 3, and the display device 1 needs to be oriented towards the user. In the present embodiment, the support rod 23 is arranged in an integral structure, and a middle part of the support rod 23 is arranged in a bent configuration according to an adjustment limit of the ball-hinged structure, such that the display device 1 can face the user under a normal state of the support rod 23.

Figure 12:
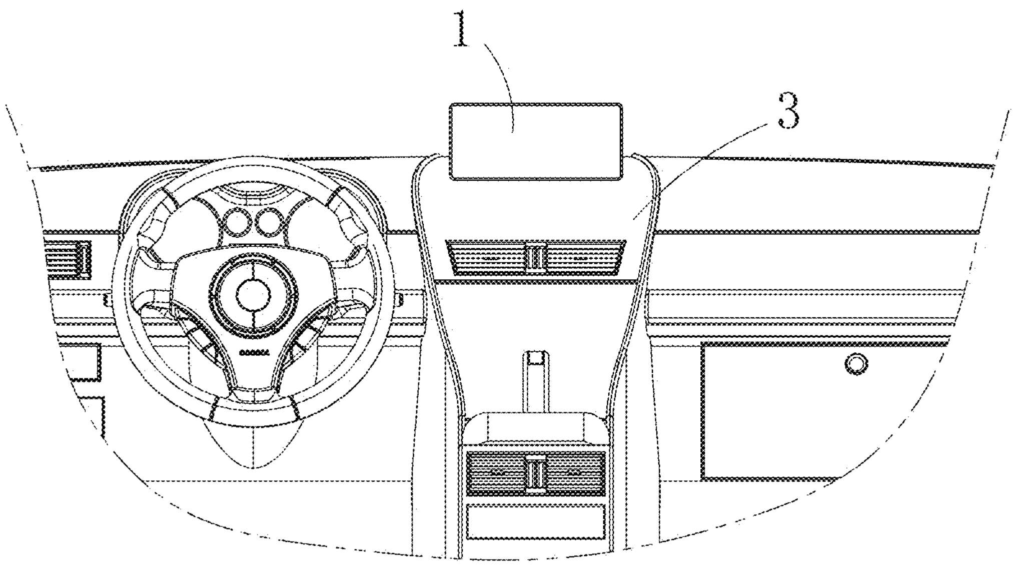
FIG. 12 is a schematic state view of the in-vehicle display mounted on the center console according to an embodiment, where the display device is shown obscuring the support bracket in a front view.

In addition, the support rod 23 in the present embodiment is short and arched, such that the support rod 23 may be obscured by the display device 1 in a front view of the in-vehicle display, as illustrated in FIG. 12, primarily for aesthetic purposes.

In another embodiment, the support rod 23 may be designed with a telescopic rod structure, which is not shown in the accompanying drawings.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. An in-vehicle display, configured to be mounted on a center console of a vehicle, the in-vehicle display comprising:

a display device, having a back shell and a screen shell, wherein the back shell and the screen shell are connected to each other to cooperatively define a receiving space; a part of the receiving space is defined in the back shell and is denoted as a first sub-space; the back shell has a first magnetic attracting area and a connecting recess which is located at an outer face of the back shell and surrounds the first magnetic attracting area, wherein the connecting recess is recessed towards the first sub-space; the back shell has an edge defining an opening communicated with the first sub-space; the edge of the back shell is connected to the screen shell;

a first magnetic attracting element, arranged inside the display device, wherein the first magnetic attracting element is received in the first sub-space at a position corresponding to the first magnetic attracting area and is covered by the back shell; and a support bracket, configured to support the display device and comprising a second magnetic attracting area and arranged with a connecting protrusion, wherein the second magnetic attracting area is capable of being magnetically connected to and attached to the first magnetic attracting area;

the connecting protrusion surrounds the second magnetic attracting area and is protruding with respect to the second magnetic attracting area; and when the first magnetic attracting area is magnetically attached to the second magnetic attracting area, the connecting protrusion is inserted into the connecting recess;

wherein the back shell has an inner face facing towards and exposed to the first sub-space; the inner face has a first region, a second region, and a third region; the second region of the inner face is located at the position corresponding to the first magnetic attracting area and configured to receive the first magnetic attracting element; the third region of the inner face protrudes to an interior of the first sub-space with respect to the first region and surrounds the first magnetic attracting element.

2. The in-vehicle display as claimed in claim 1, wherein the third region of the inner face serves as a bottom of the connecting recess.

3. The in-vehicle display as claimed in claim 1, wherein the support bracket comprises:

a magnetic connecting element, wherein the second magnetic attracting area is located on the magnetic connecting element, and when the first magnetic attracting area is magnetically attached to the second magnetic attracting area, the magnetic connecting element is attached to the back of the display device;

a mounting base, configured to be mounted on the center console of the vehicle; and a support rod, wherein a first end of the support rod is connected to the magnetic connecting element, and a second end of the support rod is connected to the mounting base.

4. The in-vehicle display as claimed in claim 3, wherein the connecting recess is defined in the outer face of the back shell facing the magnetic connecting element, the back shell is connected to the screen shell, and the first magnetic attracting element is disposed between the back shell and the screen shell; the first magnetic attracting element is attached to the back shell, and the first magnetic attracting area is formed on the outer face of the back shell facing the magnetic connecting element;

the magnetic connecting element comprises a first shell, a second shell, and a second magnetic attracting element, wherein the first shell is fixedly connected to the second shell, the connecting protrusion is arranged on a face of the first shell facing the display device, the support rod is connected to the second shell, and the second magnetic attracting element is disposed between the first shell and the second shell; the second magnetic attracting element is attached to the first shell, and the second magnetic attracting area is formed on the face of the first shell facing the display device.

5. The in-vehicle display as claimed in claim 1, wherein the connecting recess is in an annular shape, and the connecting protrusion is in an annular shape; and the connecting recess surrounds the first magnetic attracting area, the connecting protrusion surrounds the second magnetic attracting area.

6. The in-vehicle display as claimed in claim 1, wherein an area of the first magnetic attracting area is equal to an area of the second magnetic attracting area.

7. The in-vehicle display as claimed in claim 1, wherein a length of the first magnetic attracting area is in a range of one-fifth to one-third of a length of the display device.

8. The in-vehicle display according to claim 1, wherein the support bracket comprises:

a second magnetic connecting element, wherein the second magnetic attracting area is located on the second magnetic connecting element, and when the first magnetic attracting area is magnetically attached to the second magnetic attracting area, the second magnetic connecting element is attached to the back of the display device;

a mounting base, configured to be mounted on the center console of the vehicle; and a support rod, wherein a first end of the support rod is spherical and is movably connected to the magnetic connecting element, and a second end of the support rod is spherical and is movably connected to the mounting base; wherein the spherical first end of the support rod is connected to a central region of a rear side of the magnetic connecting element away from the display device; an orthographic projection of the spherical first end towards the display device is located inside the first magnetic attracting area.

9. The in-vehicle display as claimed in claim 8, wherein the magnetic connecting element comprises a connecting plate and a first connecting portion, wherein the second magnetic attracting area is defined on the connecting plate, and the first connecting portion is arranged on a side of the connecting plate away from the second magnetic attracting area;

the first end of the support rod is arranged in spherical, and the first end of the support rod is connected to the first connecting portion in a ball-hinged manner.

10. The in-vehicle display as claimed in claim 9, wherein the first connecting portion comprises a plurality of first connecting blocks connected to the connecting plate, and the plurality of first connecting blocks are arranged in a circumferential distribution and enclosed to form a first ball-jointed groove; the first end of the support rod is arranged in the first ball-jointed groove and ball-hinged to the first connecting portion, and an outer wall of each of the plurality of first connecting blocks is arranged with an external thread;

the support bracket further comprises a first locking element in a shape of a ring, the first locking element is arranged with an internal thread, an inner wall of the first locking element has a taper, the first locking element sleeves an outer side of the first connecting portion and is screwed with the first connecting portion; when the first locking element rotates and approaches the connecting plate, the plurality of first connecting blocks are forced to move inward and tighten the first end of the support rod.

11. The in-vehicle display as claimed in claim 8, wherein the mounting base comprises a mounting plate and a second connecting portion, the mounting plate is configured to be attached to the center console of the vehicle, and the second connecting portion is arranged on a side of the mounting plate away from the center console;

the second end of the support rod is arranged in a spherical structure, and the second end of the support rod is connected to the second connecting portion in a ball-hinged manner.

12. The in-vehicle display as claimed in claim 11, wherein the second connecting portion comprises a plurality of second connecting blocks connected to the mounting plate, and the plurality of second connecting blocks are arranged in a circumferential distribution and enclosed to form a second ball-jointed groove; the second end of the support rod is arranged in the second ball-jointed groove and is ball-hinged to the second connecting portion, and an outer wall of each of the plurality of second connecting blocks is arranged with an external thread;

the support bracket further comprises a second locking element in a shape of a ring, the second locking element is arranged with an internal thread, an inner wall of the second locking element has a taper, and the second locking element sleeves an outer side of the second connecting portion and is screwed with the second connecting portion; when the second locking element rotates and approaches the mounting plate, the plurality of second connecting blocks are forced to move inward and tighten the second end of the support rod.

13. The in-vehicle display as claimed in claim 11, wherein the mounting plate is made of a flexible material.

14. The in-vehicle display as claimed in claim 11, wherein the mounting plate defines a plurality of cut slots extending along a plate face of the mounting plate.

15. The in-vehicle display as claimed in claim 14, wherein each of the plurality of cut slots is in a "V" shape.

16. The in-vehicle display as claimed in claim 11, wherein a bottom of the mounting plate is arranged with an adhesive layer.

17. The in-vehicle display as claimed in claim 3, wherein the support rod is bent.

18. The in-vehicle display as claimed in claim 3, wherein the support rod has a telescopic rod structure.

19. The in-vehicle display as claimed in claim 1, wherein the first magnetic attracting area is located at a central portion of the back shell; and a width of the first magnetic attracting area is in a range from one-quarter to three-fifths of a width of the back shell; a length of the first magnetic attracting area is in a range from one-fifth to one-third of a length of the back shell.

* * * * *